US012304792B1

(12) United States Patent
Davenport

(10) Patent No.: US 12,304,792 B1
(45) Date of Patent: May 20, 2025

(54) BEVERAGE CONTAINER COVER AND OPENER

(71) Applicant: Carlon Davenport, Las Vegas, NV (US)

(72) Inventor: Carlon Davenport, Las Vegas, NV (US)

( * ) Notice: Subject to any disclaimer, the term of this patent is extended or adjusted under 35 U.S.C. 154(b) by 0 days.

(21) Appl. No.: 17/407,514

(22) Filed: Aug. 20, 2021

(51) Int. Cl.
*B67B 7/40* (2006.01)
*B65D 17/00* (2006.01)
*B65D 17/28* (2006.01)
*B65D 17/52* (2006.01)

(52) U.S. Cl.
CPC .............. *B67B 7/403* (2013.01); *B65D 17/02* (2013.01); *B65D 17/4012* (2018.01); *B65D 17/52* (2018.01); *B65D 2517/002* (2013.01)

(58) Field of Classification Search
None
See application file for complete search history.

(56) References Cited

U.S. PATENT DOCUMENTS 497,698 A * 5/1893 Weston ..................... B67B 7/24 30/443
670,992 A * 4/1901 Lomax ................... B65D 39/16 215/296
905,427 A * 12/1908 Heber ....................... B67B 7/24 30/443
1,118,645 A * 11/1914 Flower ...................... B67B 7/24 220/278
1,689,047 A * 10/1928 Packer ...................... B67B 7/24 30/443
2,338,592 A * 1/1944 Lorenzen .................. B67B 7/24 33/666
2,376,756 A * 5/1945 Bye ........................... B67B 7/24 30/446
2,620,558 A * 12/1952 Bergeron .................. B67B 7/24 30/443

(Continued)

FOREIGN PATENT DOCUMENTS

BR 102012026200 A2 * 9/2016 ............ B67B 7/403
CN 2621616 Y * 6/2004

(Continued)

OTHER PUBLICATIONS

Screen captures from YouTube video clip entitled "Pop the Top Bottle Opener Test!", 2 pages, uploaded on Jan. 25, 2017 by Taras Kul. Retrieved from Internet: https://www.youtube.com/watch?v=XJZJ7JIWmlg (Year: 2017).*

(Continued)

*Primary Examiner* — Don M Anderson
*Assistant Examiner* — Eric C Baldrighi
(74) *Attorney, Agent, or Firm* — Cramer Patent & Design, PLLC.; Aaron R. Cramer

(57) ABSTRACT

A beverage container cover and opener comprises a cylindrical beverage can cover having an outer housing and inner hemispherical dome shaped button. Within the opener and under the dome shaped button is secured a spring actuated lever in mechanical communication with a plunger. When the dome shaped button is depressed in a first direction the plunger is depressed in a second direction which opens a beverage can having a tab with which the plunger is in physical proximity.

1 Claim, 3 Drawing Sheets

(56) References Cited

U.S. PATENT DOCUMENTS

| | | | | |
|---|---|---|---|---|
| 2,795,052 | A * | 6/1957 | Felenchak | B25H 7/00 30/368 |
| 4,009,794 | A * | 3/1977 | Zapp | B65D 45/06 222/545 |
| 4,790,444 | A * | 12/1988 | Terzi | B65D 25/48 220/714 |
| 4,961,510 | A | 10/1990 | Dvoracek | |
| D315,872 | S | 4/1991 | Bixler | |
| 5,102,002 | A | 4/1992 | Whitley | |
| 5,482,175 | A * | 1/1996 | Arrar | B65D 17/503 222/206 |
| 5,535,657 | A * | 7/1996 | Bystrom | B67B 7/24 83/660 |
| 6,073,797 | A | 6/2000 | Barous | |
| 6,296,137 | B1 | 10/2001 | Bjørnsen | |
| 6,427,861 | B1 | 8/2002 | Cho | |
| 6,460,719 | B1 | 10/2002 | Finmark | |
| 6,938,808 | B1 * | 9/2005 | Potter | B67B 7/30 225/93 |
| 8,287,513 | B2 * | 10/2012 | Ellstrom | A61M 39/10 604/82 |
| D676,746 | S | 2/2013 | Shaffer et al. | |
| 9,016,034 | B2 | 4/2015 | Hall | |
| 9,889,958 | B2 * | 2/2018 | Roefs | B67B 7/20 |
| 10,293,996 | B2 | 5/2019 | Van Rixel et al. | |
| 10,800,582 | B2 * | 10/2020 | Lamberto | B65D 1/165 |
| 11,447,382 | B2 * | 9/2022 | Karmios | B67B 7/20 |
| 2005/0035080 | A1 * | 2/2005 | Romero | B67B 7/403 215/304 |
| 2006/0016820 | A1 | 1/2006 | Himes et al. | |
| 2006/0236552 | A1 * | 10/2006 | Giles | B67B 7/20 30/367 |
| 2016/0137362 | A1 * | 5/2016 | Gorsic | B65D 25/48 220/711 |
| 2021/0053810 | A1 * | 2/2021 | Evans | B26F 1/24 |
| 2021/0362992 | A1 * | 11/2021 | Ferranti | B67B 7/24 |

FOREIGN PATENT DOCUMENTS

| | | | | | |
|---|---|---|---|---|---|
| CN | 206156730 | U | * | 5/2017 | |
| CN | 109795972 | A | * | 5/2019 | |
| CN | 112850608 | A | * | 5/2021 | B67B 7/24 |
| DE | AT-6216 | U1 | * | 11/2001 | B67B 7/24 |
| EP | 0340835 | A1 | * | 11/1989 | B65D 51/222 |
| JP | 2020169050 | A | * | 10/2020 | B65D 17/34 |
| KR | 20140040337 | A | * | 4/2014 | |
| WO | WO-2010081182 | A1 | * | 7/2010 | B65D 17/02 |

OTHER PUBLICATIONS

Soda Can Covers. Product Listing [online]. CanCovers.com [retrieved on May 20, 2020]. Retrieved from the Internet: <URL: http://cancovers.com/printable_covers.php>.

* cited by examiner

BEVERAGE CONTAINER COVER AND OPENER

RELATED APPLICATIONS

Non-applicable.

FIELD OF THE INVENTION

The present invention relates generally to a beverage container cover and opener.

BACKGROUND OF THE INVENTION

Just about every type of beverage is available in cans today. Everything from beer to soda and juice to water is packaged in lightweight aluminum cans for consumer convenience. This "ready-to-consume" convenience makes them ideal for use at work, home, sporting events and the like.

Unfortunately, many people such as children and the elderly experience difficulty when trying to open the pull tab top. It is extremely difficult for many to get their finger underneath the pull tab top and apply adequate pressure to open the can. People must risk hurting their finger, breaking a fingernail, or experience the embarrassment of asking someone else to open the can for them. Accordingly, there exists a need for a means by which pull top beverage cans may be easily opened by anyone. The development of the Beverage Container Cover and Opener fulfills this need.

SUMMARY OF THE INVENTION

To achieve the above and other objectives, the present invention provides for a can opening device, comprising, a cylindrical body having a sealed bottom and a sealed top, a first housing having a circular configuration with an inner surface that defines an interior cavity, and a second housing having a circular configuration with an inner surface that defines the interior cavity.

The second housing is disposed in a spaced apart orientation allowing for the first housing to translate relative to the second housing to actuate an opening mechanism disposed within the interior cavity which is configured to open a can.

The sealed top may include an opening configured to dispense a plurality of contents contained in the can. The sealed top may include a sealing mechanism to seal an opening until used. The sealing mechanism may include a sealing tab and an actuating tab. The actuating tab may include a top surface and a bottom surface and may be disposed in a linear orientation relative to the sealing tab to seal the contents of the can. The sealing tab may be moveable by applying a force to a surface of the top of the can to orient the actuating tab in a transverse orientation to disengage the sealing tab. The actuating tab may be lifted to cause the sealing tab to disengage from the top of the can allowing the contents within the can to be dispensed through the opening. The can opening device may be configured to allow a user to open the sealing tab for some people who have difficulty lifting the actuating tab due to not wanting to break one or more long fingernails, having one or more arthritic fingers, or not having enough strength. The second housing may be smaller than the first housing such that the second housing may be configured to nest within the interior cavity.

The first housing and the second housing may be disposed on an end of the can. The second housing may include a cross-section configuration selected from the group consisting of an oval cross-section configuration, an oblong cross-section configuration, a triangular cross-section configuration, a square cross-section configuration, a polygonal cross-section configuration, an irregular cross-section configuration, a uniform cross-section configuration, a non-uniform cross-section configuration, a variable cross-section configuration, a tubular cross-section configuration, or a tapered cross-section configuration. The opening mechanism may include a lever having a spring that may be resiliently biased in a neutral orientation. The lever may be operatively connected with the first housing via a spring such includes a downward force applied to the first housing to compress the spring. The lever may be connected with a plunger device configured to apply a downwards force to the sealing tab. The plunger device may include a protrusion that punches down the sealing tab to separate it from the sealed top to create the opening, thereby avoiding use of the actuating tab. The protrusion may be shaped like the sealing tab of the can. The can opening device may be placed at the end of can that includes the actuating tab and the sealing tab. The first housing may be pressed down on, which compresses the spring to actuate the lever that actuates the plunger device causing the protrusion to press the sealing tab for disengagement from the sealed top. The first housing may include an outer surface that may be utilized for advertising or placement of a design. The can opening device may be configured for fast and effortless can opening.

BRIEF DESCRIPTION OF THE DRAWINGS

These and other features, aspects, and advantages of the present disclosure will become better understood with regard to the following description, appended claims, and accompanying drawings where:

DESCRIPTIVE KEY

Figure 1:
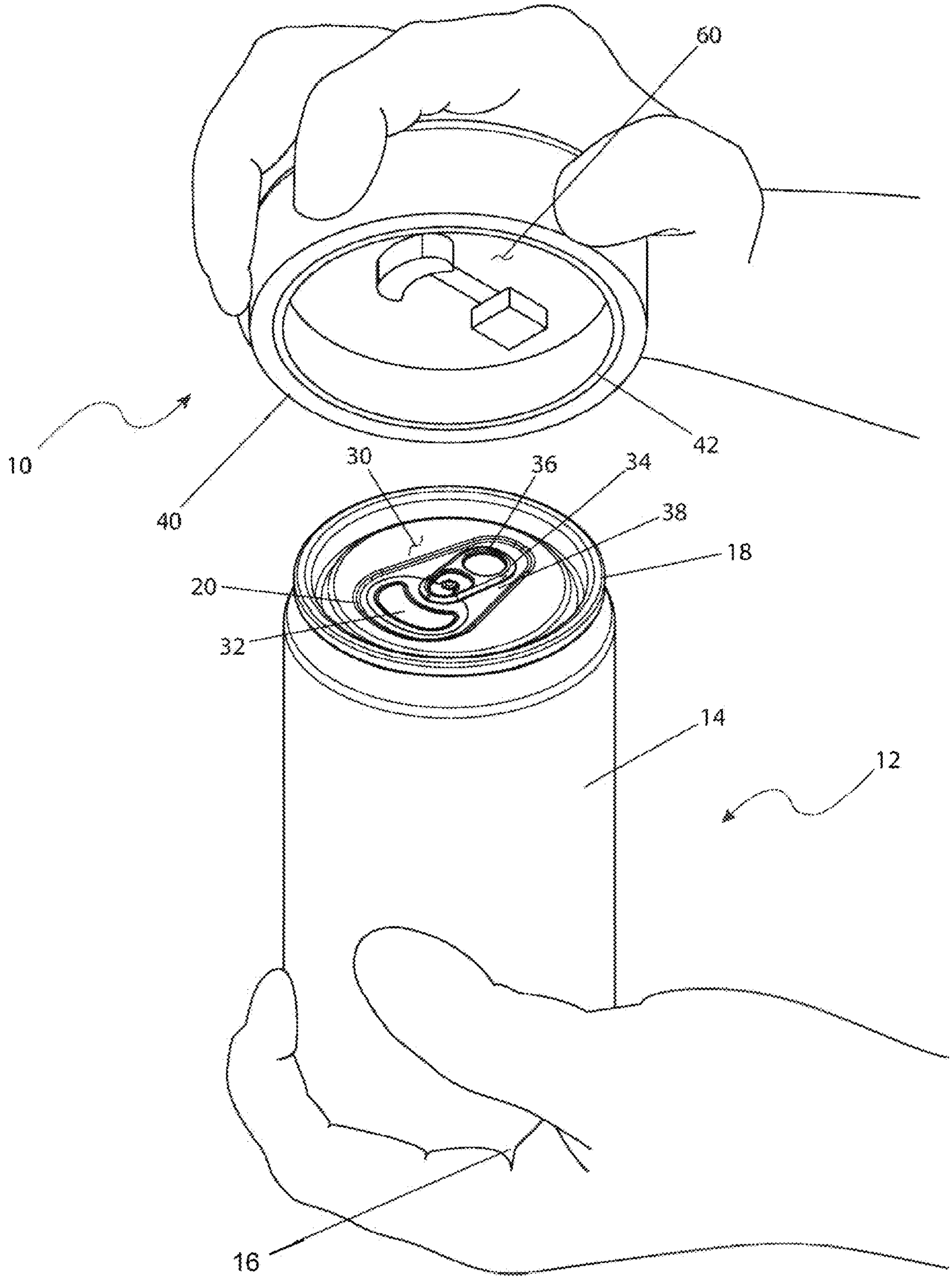
FIG. 1 is a perspective view of a can opening device 10, according to an embodiment of this disclosure.
Figure 2:
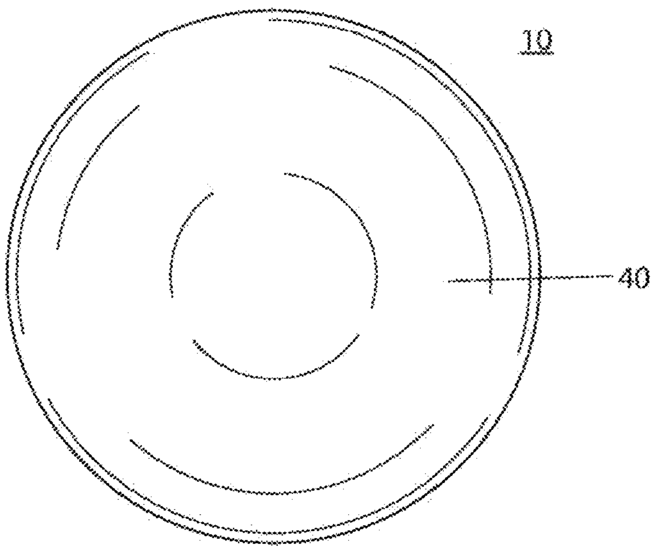
FIG. 2 is a top view of a can opening device 10, according to an embodiment of this disclosure.
Figure 3:
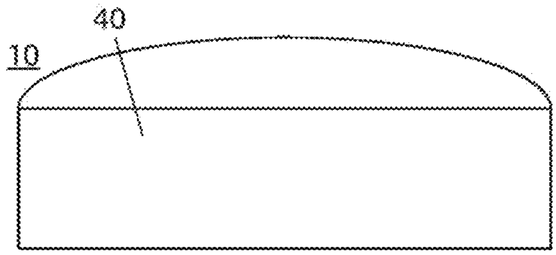
FIG. 3 is a side view of a can opening device 10, according to an embodiment of this disclosure.
Figure 4:
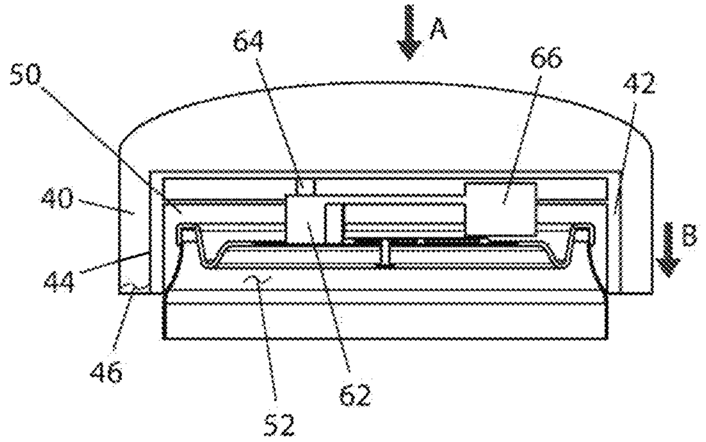
FIG. 4 is a side cross sectional view of a can opening device 10, according to an embodiment of this disclosure.
Figure 5:
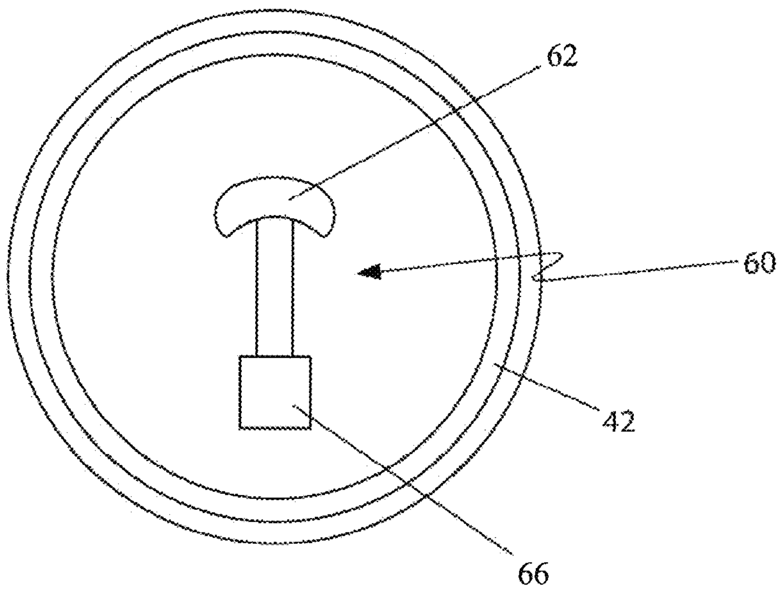
FIG. 5 is a bottom view of a can opening device 10, according to an embodiment of this disclosure; and, FIG. 6 is a side view of a component of a can opening device 10, according to an embodiment of this disclosure.
Figure 6:
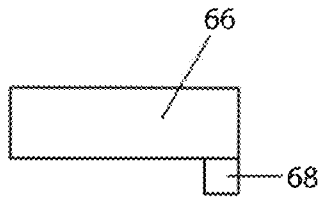

10 can opening device
12 can
14 cylindrical body
16 sealed bottom
18 sealed top
20 opening
30 sealing mechanism
32 sealing tab
34 actuating tab
36 top surface
38 surface
40 first housing
42 second housing
44 inner surface
46 interior cavity

50 inner surface
52 interior cavity
60 opening mechanism
62 lever
64 spring
66 plunger device
68 protrusion

DETAILED DESCRIPTION

The following disclosure is provided to describe various embodiments of a can opening device. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. In the following disclosure, a can opening device 10 will be discussed. The can opening device 10 of the present disclosure is configured to be used to open a can 12 that includes a pull tab sealing mechanism 30. Skilled readers should not view the inclusion of any alternative labels as limiting in any way.

Referring now to FIGS. 1-6, an illustrative can opening device 10 will now be discussed in more detail. Can opening device 10 is configured for use with a can 12. Can 12 includes a cylindrical body 14 having a sealed bottom 16 and a sealed top 18. Top 18 includes an opening 20 configured to dispense the contents of can 12. Top 18 includes a sealing mechanism 30 to seal opening 20 until use. Sealing mechanism 30 includes a sealing tab 32 and an actuating tab 34, as shown in FIG. 1. Actuating tab 34 includes a top surface 36 and a bottom surface 38. As known in the art, actuating tab 34 is disposed in a linear orientation relative to sealing tab 32 to seal the contents of can 12. Sealing tab 34 is moveable, by applying a force to surface 38, to orient actuating tab 34 in a transverse orientation to disengage sealing tab 32. For example, actuating tab 34 is lifted to cause sealing tab 32 to disengage from top 18 allowing contents within can 12 to be dispensed through opening 20. Some people have difficulty lifting actuating tab 34 either due to, for example, not wanting to break long fingernails, arthritic fingers or not enough strength. As such, can opening device 10 provides the means to open sealing tab 32.

Can opening device 10 includes a first housing 40 and a second housing 42. First housing 40 includes a domed configuration with an inner surface 44 that defines an interior cavity 46. Second housing 42 includes a cylindrical configuration with an inner surface 50 that defines an interior cavity 52. Second housing 42 is smaller than first housing 40 such that second housing 42 is configured to nest within cavity 46. Second housing 42 is disposed in a spaced apart orientation allowing for first housing 40 to translate relative to housing 42 to actuate an opening mechanism 60, as described herein.

Housings 40, 42 are sized and configured for disposal about an end of the can 12. In some embodiments, housings 40, 42 may have various cross-section configurations, such as, for example: oval, oblong, triangular, square, polygonal, irregular, uniform, non-uniform, variable, tubular and/or tapered.

Second housing 42 includes an opening mechanism 60 disposed with cavity 52. Opening mechanism 60 is configured to open the can 12, as described herein. Opening mechanism 60 includes a lever 62. Lever 62 includes a spring 64 that is resiliently biased in a neutral orientation. Lever 62 is operatively connected with the first housing 40 via spring 64 such that a downward force, as shown by arrow A in FIG. 4, applied to the first housing 40 compresses spring 64.

Lever 62 is connected with a plunger device 66. Plunger device 66 is configured to apply a downwards force, as shown by arrow B in FIG. 4, to sealing tab 32. Plunger device 66 includes a protrusion 68 configured to "punch down" sealing tab 32 to separate it from the top 18 to create the opening 20, thereby avoiding the need to use actuating tab 34. In certain embodiments, the protrusion 68 is shaped similar to the sealing tab 32 of the can 12. Other embodiments envision different geometries for the protrusion 68 that still enables the punching down on the sealing tab 32.

In use, for example, the user would place can opening device 10 with the end of the can 12 that includes actuating tab 34 and sealing tab 32. The user then presses down on the first housing 40, which compresses spring 64 to actuate lever 62. Lever 62 actuates plunger device 66 causing protrusion 68 to press sealing tab 32 for disengagement from top 18.

Can opening device 10 is configured for fast and effortless can opening. In some embodiments, the first housing 40 can include an outer surface that can be utilized for advertising or placement of a design.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

The invention claimed is:

1. A can opening device consisting of:

a first housing;

a second housing;

an opening mechanism; and, a plunger device; and, wherein the can opening device is configured to interact with a cylindrical can body having a sealed bottom and a sealed top;

wherein the sealed top comprises an opening configured to dispense contents and a sealing mechanism that comprises a sealing tab and an actuating tab;

wherein the actuating tab comprises a top surface and a bottom surface and being disposed in a linear orientation relative to the sealing tab to maintain the contents sealed within the can;

wherein the first housing is configured to be mounted on one end of the can, comprising a domed configuration with an inner surface that defines a first interior cavity and an outer surface;

wherein the first housing is configured to accommodate an advertising or a design placement;

wherein the second housing is cylindrical in shape and smaller than the first housing, with an inner surface defining a second interior cavity, such that the second housing is configured to nest within the first interior cavity of the first housing and disposed in a spaced apart orientation to allow for translational motion relative to the first housing for operating an opening mechanism;

wherein the opening mechanism is housed within the second housing, and consists of a lever with a spring resiliently biased in a neutral orientation and operatively connected to the first housing;

wherein the plunger device is connected to the lever and is configured to apply a downward force to the sealing tab;

wherein the plunger device consists of a shaped protrusion configured to press down on the sealing tab when a force is applied to the plunger device;

wherein the shaped protrusion is configured to press down on the sealing tab to disengage it from a can top, creating an opening and circumventing a need for manual actuation of the actuating tab;

wherein the first and second housings are configured with cross-sectional configurations selected from the group consisting of oval, oblong, triangular, square, polygonal, irregular, uniform, non-uniform, variable, tubular, and tapered and wherein the housings are specifically designed to facilitate an ease of use;

wherein the sealing tab is movable by applying force to its surface, thereby allowing the actuating tab to be oriented in a transverse orientation to disengage the sealing tab;

wherein the actuating tab is liftable, causing the sealing tab to disengage from the can top, thus enabling the contents within the can to be dispensed through the opening; and, wherein the can opening device is intended for placement at the can end that includes the actuating tab and the sealing tab.

* * * * *